Inventors
Anthony J. Stankavich
Thomas E. Geckle
By their attorneys

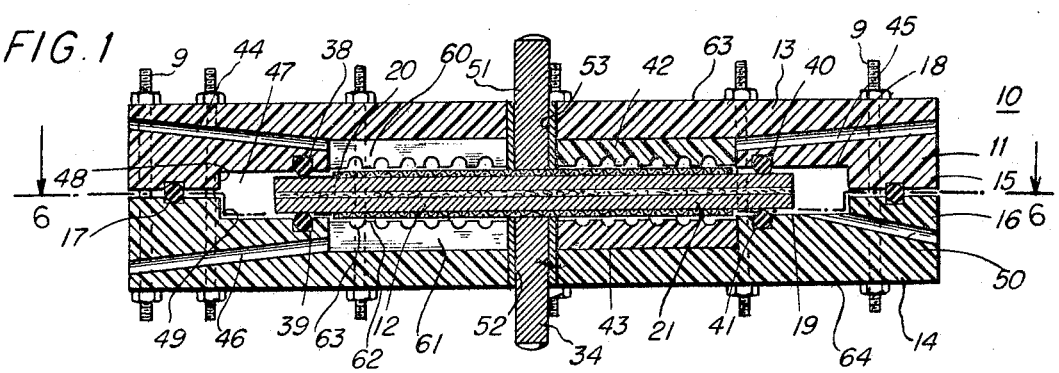
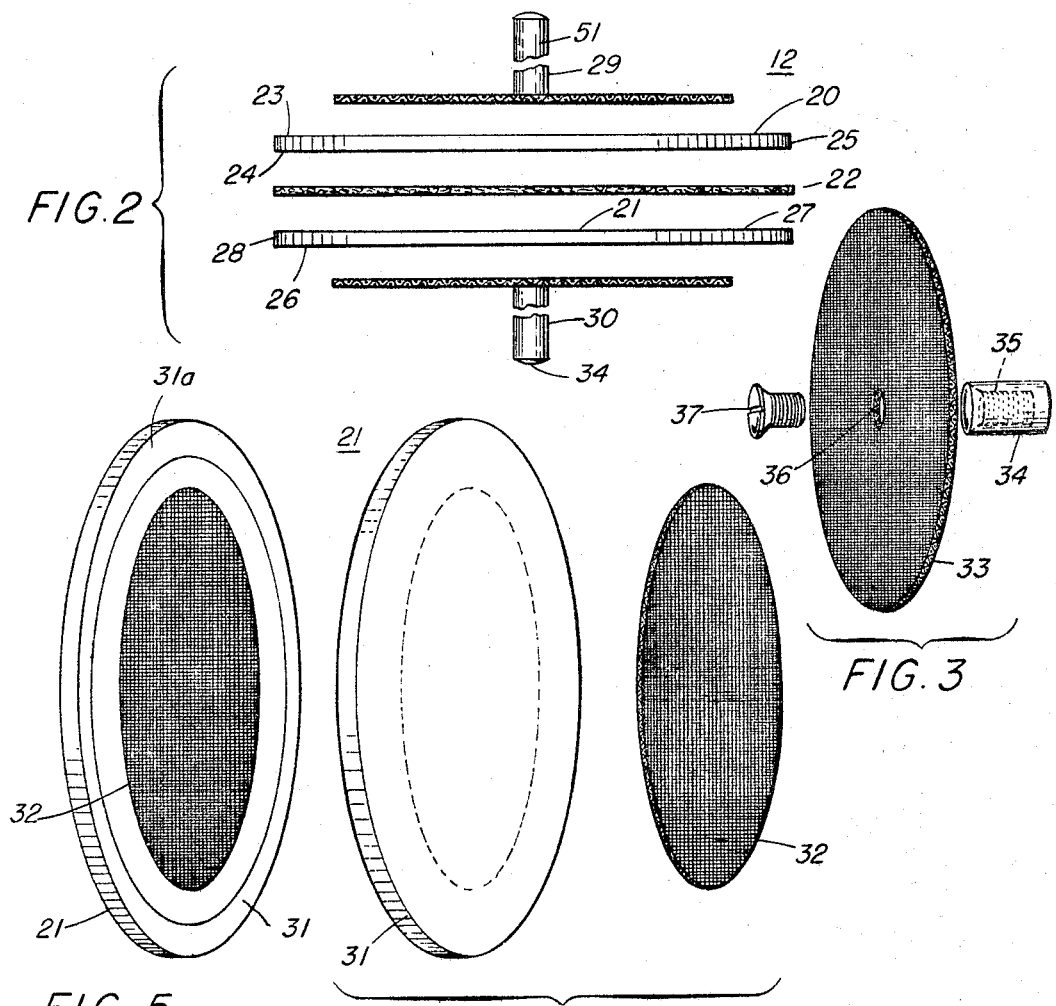

United States Patent Office 3,428,492
Patented Feb. 18, 1969

3,428,492
ELECTRODE WITH CONDUCTIVE RETICULATE ELEMENT AND FUEL CELL THEREWITH
Anthony J. Stankavich, Syracuse, and Thomas E. Geckle, Liverpool, N.Y., assignors to Carrier Corporation, Carrier Parkway, N.Y., a corporation of Delaware
Filed May 12, 1965, Ser. No. 455,134
U.S. Cl. 136—86                 5 Claims
Int. Cl. H01m 27/04

ABSTRACT OF THE DISCLOSURE

A fuel cell having a casing construction adapted for battery assembly and electrodes having surface embedded screen wire reinforcements smaller than the peripheral dimensions of the electrode matrix and more highly compacted peripheral zones extending beyond the reinforcing elements.

---

This invention relates to fuel cells and batteries and in particular to fuel cells and batteries having low internal resistance.

Fuel cells are electrochemical devices for converting the chemical energy of a fuel directly into electrical energy. In the type of fuel cell here concerned, a fluid reactant (fuel or oxidant) is fed to one surface of a porous metallic electrode. It penetrates the electrode and coming into contact with an electrolyte, undergoes a reaction involving the transfer of electrons. A second electrode (which may or may not be of the same physical structure as the first electrode) is also in contact with the electrolyte. At the second electrode another exchange of electrons occurs and when the two electrodes are connected externally a current flows.

Fuel cells in general produce high currents at low voltages. It is therefore essential that the internal resistance of the cell be as low as possible, since the effective voltage of the cell (under load) is approximately inversely proportional to the internal resistance. Moreover, fuel cells are often used in batteries, consisting of several cells connected in series. It is important that the structure connecting the individual cells in such a battery have as low a resistance as possible.

It is an object of the invention to provide fuel cells and batteries having low internal resistance.

It is another object of the invention to provide electrode units and assemblies, having low internal resistance for use in fuel cells and batteries.

It is another object of the invention to provide an internal structure connecting the fuel cells in a battery, which will minimize the internal resistance of the battery.

It is another object of the invention to provide a current collector, for use in fuel cells having a non-conducting housing such as a plastic housing and batteries assembled from such cells, which will efficiently collect and concentrate electron flows.

It is another object of the invention to provide a porous electrode for use in fuel cells which will retain its initial shape after extensive use and which is adapted for easy sealing.

Other objects will become obvious from a consideration of the following specification and claims.

In accordance with one aspect of the invention, the recited objects and others are met by a fuel cell having an electrode assembly comprising a porous electrode having an extended surface, a reticulate current collector in contact with said extended surface of said electrode and a conductor electrically connected to said collector.

In another aspect the invention includes a fuel cell having a hollow casing, said casing having a fuel section and an oxidant section, each having a wall, an electrode assembly in said casing, said assembly comprising a fuel electrode, an oxidant electrode, a reticulate current collector in contact with each of said electrodes and a conductor connected to each of said current collectors and extending through the wall of one of said fuel and oxidant sections.

In a further aspect, the invention includes a fuel battery comprising a plurality of fuel cells, each of said cells comprising an oxidant electrode and a fuel electrode, reticulate current collectors contacting each of said electrodes, and an internal conductor one end of which is attached to the current collector in contact with the fuel electrode of one of said cells and the other end of which is attached to the current collector in contact with the oxidant electrode of an adjacent cell.

In another aspect the invention comprises an electrode for use in fuel cells comprising a porous matrix, a reticulate reinforcing member embedded in said matrix and a compacted sealing zone, free from reticulate structures, about the periphery of the electrode.

The invention will be further described with reference to the drawings in which:

FIG. 1 is a view in vertical section of a fuel cell containing an electrode assembly according to the invention.

FIG. 2 is an exploded view, in elevation, of an electrode assembly according to the invention.

FIG. 3 is an exploded view, in perspective, of a current collector assembly according to the invention.

FIG. 4 is an exploded view, in perspective, of the matrix and reinforcing elements of an electrode for use in an electrode assembly according to the invention.

FIG. 5 is a perspective view of an electrode for use in an electrode assembly according to the invention.

Figure 6:
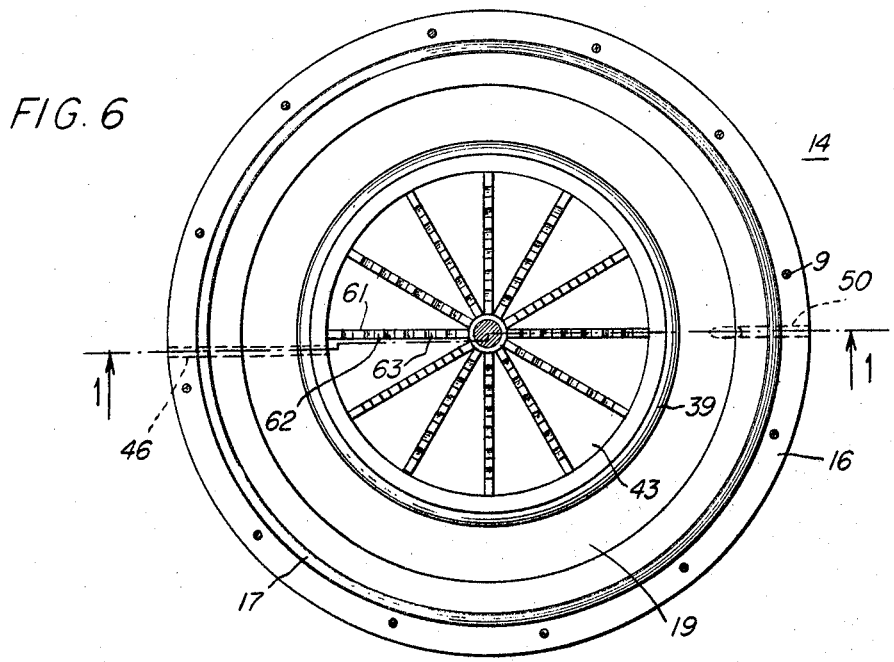
FIG. 6 is a top plan view of the oxidant section of the fuel cell of FIG. 1, taken along the line 6—6 of FIG. 1.

In the description which follows the invention will be described with reference to the specific fuel cell and battery shown in the drawings as used with oxygen or air as the oxidant, aqueous potassium hydroxide as the electrolyte and hydrazine dissolved in aqueous potassium hydroxide as the fuel. It will be understood that this specific description is furnished for illustrative purposes only and that the invention is applicable to a wide range of fuels, oxidants and cell and battery structures.

Referring to FIG. 1, a fuel cell 10 comprises a nonconducting casing 11 and an electrode assembly 12. The casing 11 comprises a fuel section 13 and an oxidant section 14. Both sections are dish-shaped. They are joined face to face with their outer rims 15, 16 abutting one another by means of bolts such as 9. A sealing ring 17 prevents leakage from the cell.

The electrode assembly 12 is positioned in the hollow interior of the casing 11, seated on shelves 18 and 19 and specifically on sealing rings 38 and 39 in the fuel and oxidant sections 13, 14, respectively.

As shown more clearly in FIG. 2, the electrode assembly 12 comprises a fuel electrode 20, an oxidant electrode 21, and interposed between them, a porous electrolyte carrier 22. The fuel electrode 20 has two extended surfaces 23 and 24, the surface 24 being in contact with the carrier 22, and a narrow edge 25. Similarly, the oxidant electrode 21 has two extended surfaces 26 and 27, the surface 27 being in contact with the carrier 22, and a narrow edge 28.

The electrode assembly 12 further comprises a current collector assembly 29 for cooperation with the fuel electrode 20, and a current collector assembly 30 for cooperation with the oxidant electrode 21.

The structure of the electrode 20 and 21 is shown more clearly in FIGS. 4 and 5. For illustrative purposes, FIGS.

4 and 5 will be described as applied to the oxidant electrode 21. It will be understood, however, that except for differences in the chemical nature of the components, the description which follows is applicable to the fuel electrode 20 as well.

Referring now to FIG. 5, the electrode 21 comprises a matrix 31 and a reticulated reinforcing element 32. The matrix may comprise any of the porous metals conventionally used in the art. The nickel plaques conventionally employed in battery construction have been found entirely suitable as matrix bases. The raw matrix bases may be impregnated with or have deposited upon them, catalytic materials whose nature depends on the chemistry of the particular system and whether the particular electrode is to be used as an oxidant or a fuel electrode. For example, in the case of the oxidant electrode in a hydrazine-oxygen cell, the electrode matrix may be made by depositing metallic silver on the porous nickel base, as by impregnating the base with $AgNO_3$ and then heating to decomposition. In the same system the fuel electrode matrix may be made by the techniques described in the copending applications of one of us (Stankavich) Ser. No. 374,381, filed June 11, 1964, and Ser. No. 374,382, filed June 11, 1964, both now abandoned.

The reinforcing element 32 may be simply a piece of metallic screen. The metal should be selected to have good conductivity and to be inert to the reactants present in the particular cell. For the hydrazine-oxygen cell, a nickel screen has been found satisfactory. The size of the screen is not critical, but normally the wire should be substantially thinner than the thickness of the matrix. The wire diameter and mesh must, moreover, be of a size sufficient to impart rigidity to the electrode. For example, with a matrix 0.07 inch thick, a 20 mesh nickel wire screen in which the wire is 0.014 inch in diameter has been found suitable.

In the construction illustrated, for reasons which will appear below, the reinforcing element 32 does not extend to the outer edge of the matrix.

With the matrix 31 prepared and the reinforcing element 32 cut to the desired size and shape, the reinforcing element 32 is brought into contact with an extended surface of the matrix 31 and pressed into that surface. The pressure exerted should be sufficient to bury the reinforcing element in the matrix so that the uppermost elements of the element are flush with the matrix surface.

In accordance with the invention, the outer region 31a (FIG. 5) of the matrix is next further pressed with an annular die at a higher pressure than that used to embed the reinforcing element 32. For example, if the reticulate element 32 is pressed into the matrix at 2 tons per square inch, the zone 31a may be compacted at 5 tons per square inch. This provides a smooth sealing zone for contact with sealing rings such as 38 and 39.

In the single cell shown in FIG. 1 the current collector assemblies 29, 30 as shown in FIG. 3, each comprise a reticulate current collector 33 and a conductor, in this case a terminal post 34. The current collector 33 may again be simply a screen made of a metal having a high conductivity which is chemically inert to the system with which it is to be used. It may be the same as or different from the screen used as the reinforcing element of the electrode. Size is not critical, though in general it will cover a substantial area of the electrode and may in some instances cover the entire electrode area. In the particular structure illustrated, the reticulated collector 33 is equal in size to the reinforcing element 32 of the associated electrode.

The terminal post 34 is also made of a highly conductive nonreactive substance, and in this instance may be nickel. It may be attached to the collector 33 by various means offering low electrical resistance. In the embodiment shown, a tapped countersunk axial hole 35 is provided at one end of the post 34. A corresponding hole 36 is provided in the center of the collector 33 and a flat head screw 37 is passed through the hole 36, and threaded into tapped hole 35 to fix the screen element 33 to the post 34. Alternatively the post may be welded or soldered to the screen, provided always that reactive materials are not thereby introduced in deleterious quantities into the system, and that the final connection furnishes a path of negligible electrical resistance.

Returning to FIG. 2, the electrodes 20, 21 and current collector assemblies 29, 30 made as indicated above, are put together in the electrode assembly 12 as indicated in FIG. 2, the electrolyte carrier 22 being interposed between the fuel and oxidant electrodes 20 and 21, the reinforced surfaces 25, 26 of the electrodes 20, 21 being in general opposite to the electrode surfaces in contact with the carrier 22. The carrier 22 is essentially an inert, porous body. A microporous asbestos mat has been found suitable.

The electrode assembly 12 is positioned in the fuel cell casing as shown in FIG. 1 with their compacted peripheral outer regions of the electrodes 20, 21 in sealing contact with sealing rings 38 and 39 which are positioned in channels 40 and 41 in the shelves 18, 19. The fuel section 13 and the oxidant section 14 of the casing 11 have central cavities 42 and 43 which are closed by the fuel electrode 20 and oxidant electrode 21, respectively. A duct 44 is provided for introducing a liquid fuel-electrolyte mixture into the cavity 42. Exhaust product from the fuel side of the cell may be removed through the duct 45.

Oxygen or other oxidant gas is introduced into the cavity 43 through a duct 46. The cavities 42 and 43 each have spider-like supporting elements 60 and 61. As shown more clearly in FIG. 6 these elements have a plurality of radial ribs 62 which contact the adjacent current collector. Notches such as 63 are provided for insuring that fluid can move circumferentially as well as radially and thus have access to the entire surface of the adjacent electrode.

It will be observed in FIG. 1 that the electrode assembly does not extend radially to the casing section rims 15 and 16, and that there is an annular vent chamber 47 between the edge of the electrode assembly and inner walls 48 and 49 of the rims 15 and 16. Gas furnished to the electrode 21 passes through that electrode and into the vent chamber 47 whence it can be removed through a duct 50. It will be observed that in the structure described, the sealing rings 38 and 39 making close contact with the compacted regions of the electrodes, effectively isolate cavities 42 and 43 from the vent chamber 47. As explained in our copending application Ser. No. 455,134, filed May 12, 1965, this routes gas radially through the oxidizing electrode 21, with beneficial results.

In the single cell of FIG. 1, the terminal posts 34 and 51 fit snugly in sockets 52, 53 provided in casing sections 13 and 14 and extend through the extended outer walls 63, 64 of those sections. Where the casing sections are molded from plastic, the posts may be molded into the casing sections as the sections are made.

Figure 7:
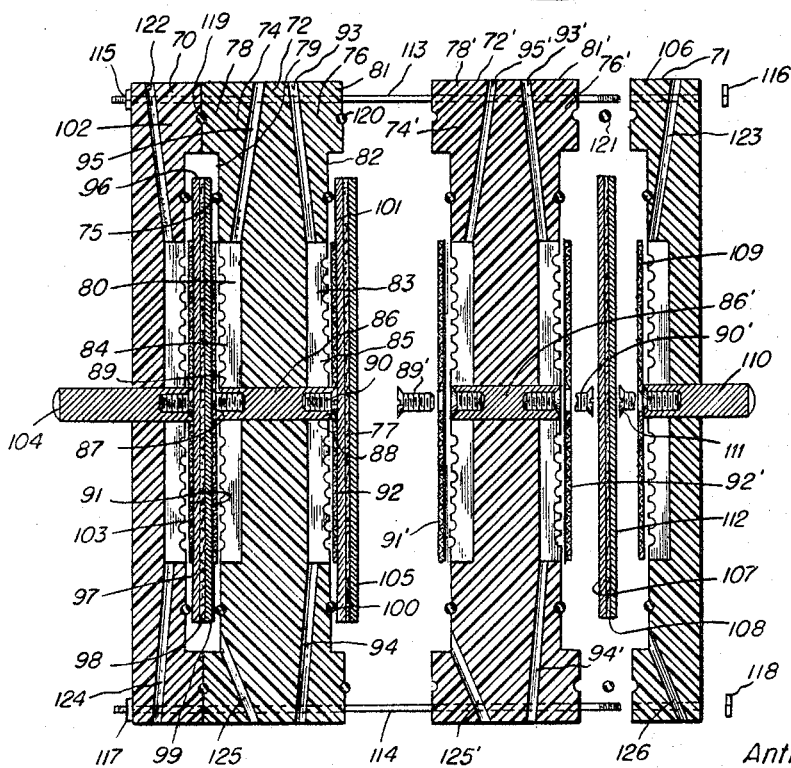
FIG. 7 is an exploded view in vertical section of a fuel battery according to the invention.

In FIG. 7 a battery of three cells is illustrated. As will appear from FIG. 7, the battery comprises two terminal casing sections 70 and 71 and in this case two intermediate casing sections 72 and 72'. The terminal casing section 70 is identical with the fuel section 13 of the single cell 10 shown in FIG. 1. Similarly, the terminal casing section 71 is identical with the oxidant section 14 of the cell 10, as shown in FIGS. 1 and 6.

The intermediate section 72 has an oxidant side 74 and a fuel side 76. It may be compared to an oxidant casing section and a fuel casing section as shown in FIG. 1, placed back to back. Thus its oxidant side 74 has a peripheral rim 78, a depressed shelf 79 inwardly of the rim 78 and a central cavity 80 inwardly of the shelf 79. Similarly the fuel side 76 of the section 72 has a peripheral rim 81, a shelf 82 and a central cavity 83. The central cavities 80 and 83 have supporting elements 84 and 85. In the center of the intermediate section 72 is a conductor, which is here a core 86. Like the terminal posts 34 and 51 of FIG. 1, the core 86 is made of a highly conductive, corrosion resistant metal such as nickel. As shown in FIG. 7 this core may be molded in the intermediate section 72, when, for example, that section is made of plastic. The core 86 is provided with tapped, countersunk holes 87, 88 in either end, to receive screws 89, 90 for mounting current collectors 91, 92.

The fuel side 76 of the intermediate casing section 72 is provided with ducts 93 and 94 for introducing and removing fuel from the central cavity 83. Similarly the oxidant side 74 has a duct 95 for introducing oxidant to the central cavity 80.

The intermediate section 72' is identical with the intermediate section 72, and like reference numerals, primed, indicate like parts in the section 72'.

In the assembled battery an electrode group 96 comprising a fuel electrode 97, an electrolyte carrier 98 and an oxidant electrode 99 is seated on the shelf 79 of the oxidant side 74 of the intermediate casing section 72 and specifically on sealing ring 75 provided in that shelf. Similarly an electrode group 77 is seated on sealing ring 100 in the shelf 82 of the fuel side 76 of section 72. The oxidant electrode 99 of electrode group 96 contacts the current collector 91 on the oxidant side of casing section 72 and fuel electrode 101 of the electrode group 77 contacts the current collector 92 on the fuel side of section 72.

The terminal section 70 is placed with its peripheral rim 102 abutting the peripheral rim 78 of the section 72 so that a current collector 103, fixed to terminal post 104 in the section 70 is pressed into contact with fuel electrode 97 of the electrode group 96. The intermediate section 72' is placed with peripheral rim 78' of its oxidant side 74' abutting the peripheral rim 81 of the fuel side 76 of section 72. Thus the current collector 91' of section 72', which is fixed to core 86' of that section by screw 89' is pressed against oxidant electrode 105 of the electrode group 77.

Finally the terminal section 71 is brought into position with its peripheral rim 106 abutting peripheral rim 81' of the fuel side 76' of section 72'. Current collector 92' which is fixed to the core 86' by a screw 90' is pressed against a fuel electrode 107 of an electrode group 108. Similarly current collector 109, fixed to terminal stud 110 by a screw 111 is pressed against oxidant electrode 112 in electrode group 108.

The individual casing sections are maintained in the assembled positions with the current collectors pressed tightly against the corresponding electrodes by means of bolts such as 113, 114 and nuts 115, 116, 117 and 118. The junctions, between adjacent sections may be sealed by sealing rings such as 119, 120 and 121.

In operation fuel, for example, a solution of hydrazine in aqueous KOH is fed to duct 124 in the terminal section 70 and ducts 94 and 94' in the intermediate sections 72 and 72'. Oxygen or air is fed to ducts 95 and 95' into the intermediate sections 72 and 72' and to duct 123 in terminal section 71. Dilute fuel solution and nitrogen produced during the reaction when hydrazine is the fuel are removed through duct 122 in terminal section 70 and through ducts 93 and 93' in intermediate sections 72 and 72'. Oxygen or air with entrained electrolyte, is removed through ducts 125 and 125' in intermediate sections 72 and 72' and duct 126 in terminal section 71.

As a result of the reactions occurring at the electrode surfaces a current may be made to flow through an external circuit (not shown) connecting terminal studs 104 and 110. The internal resistance of the battery under such circumstances is low and remains low, due in great measure to the efficient connection between adjacent cells, or more properly the electrodes of adjacent cells, obtained through the combination of reticulate current collectors attached directly to the solid integral connecting means embodied in the cores 86 and 86'. Thus, for example, a battery of the type described containing 20 cells had an internal resistance of 0.11Ω at 60 amps. load.

What is claimed is:

1. A porous metal electrode for use in fuel cells comprising a central area containing a conductive reticulate reinforcing element embedded therein such that the outermost surface of the element is exposed and is flush with the surface of the electrode and a peripheral compacted area.

2. An electrode assembly for use in a fuel cell comprising a fuel electrode and an oxidant electrode, each of said electrodes comprising a porous matrix having an extended surface, a conductive reticulate reinforcing element embedded in one surface of each of said matrices such that the outermost surface of the element is exposed and is flush with the outer surface of the matrix, and reticulate current collectors in contact with said surfaces of said matrices in which said reinforcing elements have been embedded, each of said matrices having a compacted peripheral zone extending beyond the periphery of said embedded reinforcing element.

3. The electrode assembly claimed in claim 2 wherein the reticulate current collectors are wire screens.

4. A fuel cell including a porous electrode having an extended surface, said electrode comprising a compacted porous matrix and a conductive reticulate reinforcing element embedded only in the central portion of said matrix such that the outermost surface of the element is exposed and is flush with the outer surface of the matrix, there being a peripheral zone free from said reticulated element which zone is more compacted than said central portion, a reticulated current collector in contact with said central portion of the electrode, and a conductor electrically connected to said collector.

5. A fuel battery comprising two terminal casing sections adapted to receive fuel and oxidant electrodes, respectively, a plurality of intermediate casing sections, said intermediate sections each having a fuel side and an oxidant side, reticulated current collectors in each of said sides, a conductor extending through each intermediate section and connecting said fuel side and oxidant side current collectors, a fuel electrode associated with the fuel side of each of said intermediate sections, an oxidant electrode associated with the oxidant side of each of said intermediate sections, said electrodes comprising a porous matrix having an extended surface with a conductive reticulate reinforcing element embedded in the central portion thereof such that the outermost surface of the element is exposed and is flush with the outer surface of the matrix, said electrodes having a compacted peripheral zone free of said reinforcing element, said current collectors being in contact with said central portions of said electrodes, and passages in said casing sections for circulating fuel and electrolyte, oxidant, and for venting exhaust gas.

References Cited

UNITED STATES PATENTS

| | | | |
|---|---|---|---|
| 2,716,670 | 8/1955 | Bacon | 136—86 |
| 2,776,331 | 1/1957 | Chapman | 136—75 |
| 2,942,053 | 6/1960 | Baldwin et al. | 136—175 X |
| 2,954,417 | 9/1960 | Lehovec et al. | 136—175 X |
| 3,013,098 | 12/1961 | Hunger et al. | 136—86 |
| 3,020,327 | 2/1962 | Ruetschi | 136—86 X |
| 3,135,674 | 6/1964 | Ruetschi | 204—284 X |
| 3,265,536 | 8/1966 | Miller et al. | 136—86 |

FOREIGN PATENTS 1,383,863  11/1964  France.

ALLEN B. CURTIS, *Primary Examiner.*

U.S. Cl. X.R.

136—120